United States Patent [19]

Nishihara et al.

[11] Patent Number: 5,900,313
[45] Date of Patent: May 4, 1999

[54] PLASTIC FORMED PRODUCT CONTAINING SPECIFIC PARTICLES OF FERRIC OXIDE HYDROXIDE OR IRON OXIDE

[75] Inventors: Masaharu Nishihara, Marugame; Masaaki Nishikawa; Suminori Tanaka, both of Kagawa-ken; Nanao Horiishi; Satoru Saito, both of Hiroshima; Naruo Yokoyama; Kazuyuki Hayashi, both of Hiroshima; Masayuki Watanabe, Hiroshima, all of Japan

[73] Assignee: Toda Kogyo Corporation, Japan

[21] Appl. No.: 08/529,409

[22] Filed: Sep. 18, 1995

[51] Int. Cl.$^6$ .................................................... B32B 5/16
[52] U.S. Cl. .......................... 428/328; 428/689; 428/900
[58] Field of Search ...................................... 428/323, 328, 428/689, 900

[56] References Cited

U.S. PATENT DOCUMENTS

| | | | |
|---|---|---|---|
| 4,542,271 | 9/1985 | Tanonis et al. | 219/10.55 |
| 4,865,834 | 9/1989 | Tanihara et al. | 423/634 |
| 4,873,010 | 10/1989 | Takedoi et al. | 252/63.59 |
| 5,009,712 | 4/1991 | Tamari et al. | 106/456 |
| 5,093,100 | 3/1992 | Sadamura et al. | 423/632 |
| 5,112,403 | 5/1992 | Okura et al. | 106/418 |
| 5,133,805 | 7/1992 | Kurata et al. | 106/456 |
| 5,137,783 | 8/1992 | Tanihara et al. | 428/407 |
| 5,271,857 | 12/1993 | Ino et al. | 252/62.54 |
| 5,525,749 | 6/1996 | Nishimura et al. | 523/322 |

FOREIGN PATENT DOCUMENTS 0 379 805   8/1990   European Pat. Off. .

*Primary Examiner*—H. Thi Le
*Attorney, Agent, or Firm*—Nixon & Vanderhye

[57] ABSTRACT

The disclosure describes plastic formed products comprising:

one selected from the group consisting of a thermoplastic resin and a thermosetting resin; and 0.1 to 10 wt % of at least one selected from the group consisting of ferric oxide hydroxide particles, hematite particles, magnetite particles and maghemite particles;

wherein (1) the average major axial diameter or the plate diameter of said ferric oxide hydroxide particles is 0.02 or 2.0 $\mu$m and the average aspect ratio or the plate ratio thereof is 2 to 20, (2) the average particle size of said hematite particles, magnetite particles and maghemite particles is 0.01 to 1.0, the BET specific surface area thereof is 1 to 120 m$^2$/g and the water content on the surfaces thereof is not less than 0.02 wt %/m$^2$/g.

14 Claims, 3 Drawing Sheets

PLASTIC FORMED PRODUCT CONTAINING SPECIFIC PARTICLES OF FERRIC OXIDE HYDROXIDE OR IRON OXIDE

BACKGROUND OF THE INVENTION

The present invention relates to plastic formed products, and more particularly, to plastic formed products which are capable of reducing the amount of residual ash after the plastic formed products are incinerated even under the conditions of a low temperature and a low oxygen concentration due to the incineration-accelerating operation thereof.

Since plastics are capable of being freely molded and have excellent properties of all kinds, a large amount of the plastic formed products are used in industries of all sorts. After accomplishing the using purposes, these plastic formed products are scrap-treated. It is difficult to decompose physically, chemically or biologically a large number of the plastic formed products in materials circulation in natural and since the materials of all kinds are to be used, a huge cost for recovering and recycling the plastic formed products is required. As a results, the reclamation or incineration of the plastic formed products is performed.

However, it is well known that a greater parts of refuse problems is a refuse disposal of the plastic formed products because of the social expense and technical difficulty for refuse disposal thereof.

The plastic formed products are divided broadly into two categories such as (1) industrial materials and durable consumer goods used for a relatively long period (e.g. from several years to several tens years), and (2) goods used for a short period (e.g. from several days to one year) utilizing the serviceability by the specified properties and at the time of using. However, with a recent change in the mode of living to mass consumption-type living, a large amount of the plastic formed products in uses for one way-type for reducing the distribution cost and for disposal-type for the serviceability at the using time are used, and as a result, the amount of the refuse discharged from homes has increased.

In European countries, a maker should recover the plastic wastes discharged from consumers. It is considered that the plastic wastes are reused as energy resource by generating electricity by utilizing the combustion heat. However, at this time, the plastic wastes in many countries are disposed by the incineration and reclamation.

The present invention will be explained in the following with plastic bags cited as an example.

In supermarkets, large specialty stores and retail shops, plastic bags which are printed or colored for the respective stores are generally supplied to the customers at the counters. After such shopping bags are used to carry the goods, they are reused in homes as sorting bags, refuse bags or the like, because they generally have holding portions which facilitate carrying them or closing the mouth portions thereof.

With a recent change in the mode of living and a recent rise in the living standard and an income level, many new commercial goods have been introduced and an affluent material society is realized. On the other hand, with an increase in new commercial goods, the amount of refuse discharged from homes has been increasing, so that refuse disposal has now become a large social problem.

In a method of disposing combustible refuse, the refuse which is generally put into a black or blue plastic bag composed of a thermoplastic resin such as polyethylene and a pigment added thereto is incinerated in an incinerator, and the residual ash after incineration and unburned refuse are used for reclamation.

However, a conventional method of incinerating the combustible refuse has various problems such as air contamination due to NOx generated during incineration, shortage of sites for reclamation into which a large amount of residual ash after incineration and unburned refuse are buried, leakage of a harmful ingredient of residual ash in the reclaimed land, and generation of harmful dioxins. In addition, when a large amount of plastic waste and plastic bag which have a high calorific value is contained in combustible refuse, the temperature in the incinerator is raised so much that the incinerator is broken.

As a method of solving these problems, various methods are proposed. They are, for example, a method of suppressing the generation of NOx by incinerating combustible refuse under the condition of a low oxygen concentration, a method of preventing the breakage of an incinerator due to a rise in temperature by so controlling the incinerator as to be not higher than a predetermined temperature by spraying water during incineration, and a method of insolubilizing the residual ash containing harmful ingredients and cementing it before burying it. In some municipal corporations, it is a duty of the inhabitants to use a translucent plastic refuse bag which contains a large amount of calcium carbonate in place of a conventional refuse bag in order to reduce the amount of refuse and lower the calorific value. It is reported that many municipal corporations appeal to supermarkets and the like for adoption of translucent shopping bags containing calcium carbonate like a refuse bag, because the shopping bags are often reused as refuse bags in homes.

Plastic bags containing iron oxide are also proposed. For example, a method of dispersing a fine ferromagnetic powder in a thermoplastic resin so as to separate plastic wastes by the magnetic action (Japanese Patent Application Laid-Open (KOKAI) No. 52-68247/1977), and a method of producing a plastic bag from polyethylene or polypropylene containing titanium oxide, aluminum oxide, nickel oxide and iron oxide such as ferrous oxide and ferric oxide so as to prevent the generation of an offensive odor from the refuse in the bag (Japanese Patent Application Laid-Open (KOKAI) No. 3-212353/1991) are proposed.

As described above, since the original use of shopping bags is to accommodate goods therein for carrying and they have a function of advertising the supermarket or the retail store which supplies them to the customers, the shopping bags are required to have an excellent color tone and a high mechanical strength, to use no harmful ingredient, and further to be produced at a low cost. It is very difficult to produce a shopping bag which meets all these demands while taking the problem of refuse disposal into consideration.

The suppression of the NOx content generated during incinerating refuse, the prevention of the breakage of an incinerator and a reduction of unburned refuse and residual ash are now in the strongest demand. If the refuse is incinerated under the conditions of a low temperature and a low oxygen concentration, although it is effective for the suppression of the NOx content generated during incinerating refuse and the prevention of the breakage of an incinerator, since the combustion efficiency is lowered, the residual ash and the unburned refuse disadvantageously increase.

If a thermoplastic resin for shopping bags contains a large amount of calcium carbonates not only is the external appearance bad, but also the mechanical strength is lowered and the calcium carbonate adhered to the film surface is apt to adhere to clothes and commercial goods. In addition, although such bags are effective for the prevention of the breakage of an incinerator due to a high temperature, the amount of residual ash and unburned refuse disadvantageously increases by the amount equivalent to the amount of calcium carbonate added.

The method of Japanese Patent Application Laid-Open (KOKAI) No. 52-68247/1977 is aimed at providing plastics with magnetism by mixing and dispersing a fine ferromagnetic powder such as magnetite with and in the plastics so as to collect the plastics, and a method of Japanese Patent Application Laid-Open (KOKAI) No. 3-212353/1991 is aimed at preventing an offensive odor in the garbage in a plastic bag by adding a gas decomposing material containing at least titanium oxide, aluminum oxide, nickel oxide and iron oxide to polyethylene or polypropylene which constitutes the bag. Japanese Patent Application Laid-Open (KOKAI) No. 3-212353/1991 is silent on the disclosure or suggestion of the technical problem that the combustion efficiency should be maintained and the unburned refuse, residual ash and an harmful ingredient should be reduced as much as possible even under the conditions of a low temperature and a low oxygen concentration.

At the time of incineration of plastic formed products, the plastics are molten and become blocks and combustible volatile compounds vaporize from the plastics in which the solid form thereof is maintained, the necessary amount of oxygen for incinerating the plastic formed products is in short supply, so that harmful unburned refuse sometimes remains or the incineration takes a long time.

Accordingly, provision of plastic formed products which are capable of a high combustion efficiency even if they are incinerated together with combustible refuse, and which are capable of reducing the amount of unburned refuse and residual ash is strongly demanded.

Especially, provision of plastic formed products which are capable of providing an excellent color tones a high mechanical strength and safety, and which are also capable of maintaining a high combustion efficiency for a long time even if they are incinerated together with combustible refuse, and reducing the amount of unburned refuse and residual ash is strongly demanded.

As a result of studies undertaken by the present inventors so as to meet the demand, it has been found that by mixing and kneading 0.1 to 10.0 wt % of ferric oxide hydroxide particles and/or iron oxide particles with a thermoplastic resin or a thermosetting resin and forming the resultant mixture, the combustion efficiency of the obtained plastic formed products does not lower even if the plastic formed products are incinerated together with combustible refuse under the condition of a low temperature and a low oxygen concentration, and generates only a small amount of unburned refuse and residual ash. The present invention has been achieved on the basis of this finding.

SUMMARY OF THE INVENTION

It is an object of the present invention to provide plastic formed products which are capable of incinerating at a high combustion efficiency even if the plastic formed products are incinerated together with combustible refuse under the condition of a low temperature and a low oxygen concentration, which are capable of reducing the amount of unburned refuse and residual ash, and which are capable of suppressing the generation of NOx and dioxins.

It is another object of the present invention to provide plastic bags which are capable of providing an excellent color tone, a high mechanical strength and safety, and which are also capable of a high combustion efficiency even if the plastic bags are incinerated together with combustible refuse under the condition of a low temperature and a low oxygen concentration, and reducing the amount of unburned refuse, residual ash and harmful ingredient after incineration as much as possible.

To achieve these aims, in a first aspect of the present invention, there is provided plastic formed products comprising: a thermoplastic resin or a thermosetting resin, and 0.1 to 10 wt % of at least one selected from the group consisting of ferric oxide hydroxide particles, hematite particles, magnetite particles and maghemite particles, wherein (1) the average major axial diameter or the plate diameter of the ferric oxide hydroxide particles is 0.02 or 2.0 $\mu$m and the average aspect ratio or the plate ratio of the ferric oxide hydroxide particles is 2 to 20; and (2) the average particle size of the hematite particles, magnetite particles and maghemite particles is 0.01 to 1.0 $\mu$m, the BET specific surface area of the hematite particles, magnetite particles and maghemite particles is 1 to 120 $m^2/g$, and the water content on the surfaces of the hematite particles, magnetite particles and maghemite particles is not less than 0.02 wt %/$m^2$/g.

In a second aspect of the present invention, there is provided plastic formed products comprising: a thermoplastic resin or a thermosetting resin, and 0.1 to 10 wt % of spindle-shaped ferric oxide hydroxide particles, wherein the major axial diameter thereof is 0.05 to 1.5 $\mu$m, the aspect ratio (major axial diameter/minor axial diameter) thereof is 2 to 18, and the BET specific surface area thereof is 30 to 250 $m^2/g$.

In a third aspect of the present invention, there is provided plastic formed products comprising: a thermoplastic resin or a thermosetting resin, and 0.1 to 10 wt % of acicular ferric oxide hydroxide particles, wherein the major axial diameter thereof is 0.05 to 2.0 $\mu$m, the aspect ratio (major axial diameter/minor axial diameter) thereof is 2 to 20, and the BET specific surface area thereof is 10 to 200 $m^2/g$.

In a fourth aspect of the present invention, there is provided plastic formed products comprising: a thermoplastic resin or a thermosetting resin, and 0.1 to 10 wt % of at least spindle-shaped particles selected from the group consisting of hematite particles, magnetite particles and maghemite particles, wherein the major axial diameter thereof is 0.03 to 1.0 $\mu$m, the aspect ratio thereof is 2 to 12, the BET specific surface area is 5 to 200 $m^2/g$, and the water content on the surfaces thereof is not less than 0.02 wt %/$m^2$/g.

In a fifth aspect of the present invention, there is provided plastic formed products comprising: a thermoplastic resin or a thermosetting resin, and 0.1 to 10 wt % of at least granular particles selected from the group consisting of hematite particles, magnetite particles and maghemite particles, wherein the average particle size thereof is 0.01 to 1.0 $\mu$m, the BET specific surface area thereof is 1 to 120 $m^2/g$, and the water content on the surfaces thereof is not less than 0.02 wt %/$m^2$/g.

In a sixth aspect of the present invention, there is provided plastic formed products comprising: a thermoplastic resin or a thermosetting resin, and 0.1 to 10 wt % of at least granular particles selected from the group consisting of hematite particles, magnetite particles and maghemite particles, wherein the average particle size thereof is 0.05 to 0.5 μm, the BET specific surface area thereof is 2 to 30 m²/g, and the water content on the surfaces thereof is 0.02 to 0.10 wt %/m²/g.

DETAILED DESCRIPTION OF THE INVENTION

As a thermoplastic resin or a thermosetting resin used in the present invention, any resin which are suitable for ordinary moldings are usable without special limitation.

Examples of the thermoplastic resin are polyethylene-based resins, polypropylenes, polystyrenes, acrylonitrilstyrene copolymers, polyvinyl chloride, polyvinylidene chloride, acrylonitril-butadiene-styrene copolymers, poly-4-methylpentene-1, ionomers, polyvinyl alcohols, polycarbonates, polyamide, modified polyphenylene ether resins, thermoplastic polyester resins, thermoplastic elastomers and cellulosic resins. As the polyethylene-based resins, low-density polyethylenes, linear low-density polyethylenes, high-density polyethylenes, and copolymers of ethylene, another polymeric monomers such as (meth) acrylate and vinyl acetate, and ethylene-vinylalcohol copolymer may be exemplified.

Examples of the thermosetting resin used in the present invention are phenol resins, epoxy resins, unsaturated polyester resins, urea resins, melamine resins and polyurethane resins.

Especially, as a thermoplastic resin for a plastic bag in the present invention, polyethylene-based resins such as low-density polyethylenes (density: 0.915 to 0.935), linear low-density polyethylenes (density: 0.890 to 0.945), high-density polyethylenes (density: 0.940 to 0.970), and copolymers of ethylene and another polymeric monomers such as (meth) acrylate and vinyl acetate are preferably usable because they are cheap and available in large quantities. Above all, high-density polyethylenes and linear low-density polyethylenes are especially preferably used because they can produce a film having a high mechanical strength even if the film is comparatively thin.

As the ferric oxide hydroxide particles and/or iron oxide particles used in the present invention, particles having appropriate particle shape, number-average particle diameter, BET specific surface area and particle size distribution, and containing impurities (e.g., sulfur, sodium, etc.) of not more than each specific amount, are preferred.

The particle shape and number-average particle diameter thereof affect a contact-interface area between the ferric oxide hydroxide particles and/or iron oxide particles and the resin, and the combustion efficiency. Also, the BET specific surface area affects the contact-interface area therebetween. The particle size distribution affects the combustion efficiency through the packing density of the particles dispersed into the resin. Further, the impurity content in the particles, e.g., sulfur content and sodium content, affects a combustive-catalytic activity per the contact-interface area between the particles and resin.

The particle size distribution of the particles is expressed by:

Percentage (%) = [the geometrical standard deviation $(\sigma g)$ / the number-average particle diameter $(M)$] × 100.

The geometrical standard deviation ($\sigma g$) were obtained by the following method. The particle diameters of 250 particles in an electron microphotograph (×40,000 magnification) were measured. The actual particle diameters and the number of the particles were obtained from the calculation on the basis of the measured values. In logarithmic-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation ($\sigma g$) was measured from the following formula:

Geometrical standard deviation $(\sigma g)$ =
major axial diameter (μm) corresponding to the number of particles of 50%/major axial diameter (μm) corresponding to the number of particles of 84.13%.

The content of sulfur as an impurity in the ferric oxide hydroxide particles and/or iron oxide particles was measured by using Carbon-Sulfur Analyzer EMIA-200 (manufactured by Horiba Ltd.).

The content of sodium as an impurity in the ferric oxide hydroxide particles and/or iron oxide particles was measured by an analytical curve method by solving the particles in hydrochloric acid and using Inductively Coupled Plasma Atomic Emission Spectrophotometer SPS-4000 (manufactured by Seiko Instruments Inc.).

As the ferric oxide hydroxide particles in the present invention are usable goethite (α-FeOOH) particles, lepidocrosite (γ-FeOOH) particles and δ-FeOOH particles. The particles may have any shape selected from the group consisting of a spindle shape, an acicular shape and a plate-like shape, but spindle-shaped ferric oxide hydroxide particles are the most preferable from the point of view of combustion efficiency.

The particle size (major axial diameter or the plate diameter) of the ferric oxide hydroxide particles is 0.02 to 2.0 μm and the aspect ratio or the plate ratio thereof is 2 to 2.0. The sulfur content of the ferric oxide hydroxide particles is not more than 0.8 wt %, the sodium content thereof is not more than 0.5 wt % and the particle size distribution thereof is not more than 60%.

The spindle-shaped ferric oxide hydroxide particles have an external appearance of a bundle of a multiplicity of superfine fibers according to the observation through an electron microscope, and the major axial diameter of the spindle-shaped ferric oxide hydroxide particles is 0.05 to 1.5 μm, the aspect ratio (major axial diameter/minor axial diameter) thereof is 2 to 18, and the BET specific surface area thereof is 30 to 250 m$^2$/g. From the point of view of combustion efficiency, the spindle-shaped ferric oxide hydroxide particles having a major axial diameter of 0.1 to 0.5 μm, an aspect ratio of 3 to 15 and a BET specific surface area of 50 to 150 m$^2$/g are preferable. If the BET specific surface area is larger than 250 m$^2$/g, the degree of dispersion of the particles in the resin is lowered. The sulfur content of the spindle-shaped ferric oxide hydroxide particles is not more than 0.2 wt %, preferably 0.08 wt %, the sodium content thereof is not more than 0.5 wt %, preferably 0.3 wt %, and the particle size distribution thereof is not more than 50%, preferably not more than 40%.

The acicular ferric oxide hydroxide particles include not only acicular particles but also particles having a shape of a needle with some branches. The major axial diameter of the acicular ferric oxide hydroxide particles is 0.05 to 2.0 μm, the aspect ratio (major axial diameter/minor axial diameter) thereof is 2 to 20, and the BET specific surface area thereof is 10 to 200 m$^2$/g. From the point of view of combustion efficiency, the acicular ferric oxide hydroxide particles having a major axial diameter of 0.1 to 0.8 μm, an aspect ratio of 5 to 15 and a BET specific surface area of 15 to 100 m$^2$/g are preferable. The sulfur content of the acicular ferric oxide hydroxide particles is not more than 0.1 wt %, preferably 0.05 wt %, the sodium content thereof is not more than 0.5 wt %, preferably 0.3 wt %, and the particle size distribution thereof is not more than 60%, preferably not more than 50%.

The plate-like ferric oxide hydroxide particles have an external appearance of a hexagonal plate or a circular plate according to the observation through an electron microscope, and the plate diameter of the plate-like ferric oxide hydroxide particles is 0.02 to 1.5 μm, the plate ratio (plate diameter/thickness) thereof is about 3 to 15, and the BET specific surface area thereof is 1 to 150 m$^2$/g. From the point of view of combustion efficiency, the plate-like ferric oxide hydroxide particles having a plate diameter of 0.03 to 0.5 μm, a plate ratio (plate diameter/thickness) of 5 to 10 and a BET specific surface area of 20 to 100 m$^2$/g are preferable. The sulfur content of the plate-like ferric oxide hydroxide particles is not more than 0.1 wt %, preferably 0.05 wt %, the sodium content thereof is not more than 0.1 wt %, preferably 0.05 wt %, and the particle size distribution thereof is not more than 50%, preferably not more than 40%.

It is possible to produce these ferric oxide hydroxide particles having various shapes from an aqueous solution by passing an oxygen-containing gas into a suspension which contains a neutralization reaction product of an aqueous ferrous salt solution and an aqueous alkali solution such as an aqueous alkali hydroxide and an aqueous alkaline carbonate in the presence or absence of an additive preferably at a temperature of 20 to 70° C.

The iron oxide particles used in the present invention are hematite (α-Fe$_2$O$_3$) particles, magnetite (FeO$_x$.Fe$_2$O$_3$, $0 \leq x < 1$) particles and maghemite (γ-Fe$_2$O$_3$) particles. These particles may have any shape selected from the group consisting of a spindle shape, an acicular shape, a plate shape and an approximately isotropic (granular) shape such as spherical, octahedral, polyhedral and irregular shapes.

The average particle size of the granular hematite, magnetite or maghemite particles is 0.01 to 1.0 μm, preferably 0.05 to 0.5 μm, and the BET specific surface area thereof is 1 to 120 m$^2$/g, preferably 2 to 30 m$^2$/g. The sulfur content of the granular hematite, magnetite or maghemite particles is not more than 0.8 wt %, preferably 0.6 wt %, the sodium content thereof is not more than 0.5 wt %, preferably 0.25 wt %, and the particle size distribution thereof is not more than 50%, preferably not more than 40%.

The water content on the surfaces of the granular hematite, magnetite or maghemite particles used in the present invention is not less than 0.02 wt %/m$^2$/g. If it is less than 0.02 wt %/m$^2$/g, it is impossible to obtain plastic formed products having a combustion efficiency which is aimed at by the present invention. On the other hands if it exceeds 0.10 wt %/m$^2$/g, the degree of dispersion of the granular hematite or maghemite particles in the thermoplastic resin is sometimes lowered.

The major axial diameter of the spindle-shaped or acicular hematite, magnetite or maghemite particles is 0.03 to 1.0 μm, the aspect ratio thereof is 2 to 12, and the BET specific surface area is 5 to 200 m$^2$/g. From the point of view of combustion efficiency, it is preferable that the major axial diameter is 0.05 to 0.3 μm, the aspect ratio is 3 to 10 and the BET specific surface area is 20 to 100 m$^2$/g. The sulfur content of the spindle-shaped or acicular hematite, magnetite or maghemite particles is not more than 0.2 wt %, preferably 0.1 wt %, the sodium content thereof is not more than 0.5 wt %, preferably 0.35 wt %, and the particle size distribution thereof is not more than 50%, preferably not more than 45%.

The water content on the surfaces of the spindle-shaped or acicular hematite, magnetite or maghemite particles used in the present invention is not less than 0.02 wt %/m$^2$/g.

The plate diameter of the plate-like hematite, magnetite or maghemite particles is 0.05 to 5.0 μm, the aspect ratio thereof is 4 to 50, and the BET specific surface area is 2 to 100 m$^2$/g. From the point of view of combustion efficiency, it is preferable that the major axial diameter is 0.2 to 3 μm, the aspect ratio is 5 to 30 and the BET specific surface area is 3 to 50 m$^2$/g. The water content on the surfaces of the granular hematite, magnetite or maghemite particles used in the present invention is not less than 0.02 wt %/m$^2$/g.

It is possible to produce the spindle-shaped or acicular hematite, magnetite and maghemite particles by heating the above-described spindle-shaped ferric oxide hydroxide particles or acicular ferric oxide hydroxide particles obtained from the aqueous solution in the air at 250 to 700° C. while maintaining the shape of the hematite particles, by heating the thus-obtained hematite particles in a reducing atmosphere at 300 to 500° C. while maintaining the shape of the hematite particles, and by oxidizing the thus-obtained magnetite particles in the air at 200 to 500° C. while maintaining the shape of the magnetite particles, respectively.

It is possible to produce the plate-like hematite, magnetite and maghemite particles by heat-treating the precipitates in the neutralization reaction of an aqueous ferrous salt solution and an aqueous alkali solution in an autoclave, by further heating the thus-obtained hematite particles in a reducing atmosphere in a stream of hydrogen at 300 to 500° C. while maintaining the shape of the plate-like hematite particles, and by further oxidizing the thus-obtained magnetite particles in the air at 200 to 500° C. while maintaining the shape of the plate-like magnetite particles, respectively.

It is possible to produce the granular magnetite, maghemite and hematite particles by passing an oxygen-containing gas into a suspension which contains precipitates in the neutralization reaction of an aqueous ferrous salt solution and an aqueous alkali solution such as an aqueous alkali hydroxide and an aqueous alkali carbonate, by heating the thus-obtained magnetite particles in the air at 200 to 500° C. while maintaining the shape of the granular magnetite particles, and by further heating the thus-obtained maghemite particles or granular magnetite particles at 500 to 900° C. while maintaining the shape of the particles, respectively.

These ferric oxide hydroxide particles and iron oxide particles have various colors. For example, the ferric oxide hydroxide particles exhibit yellow to yellowish brown colors, the hematite particles reddish orange to reddish purple, the magnetite particles black to blackish brown colors, the maghemite particles a brown color, and a powder obtained by mixing yellow ferric oxide hydroxide particles with black magnetite particles in an appropriate ratio exhibit a green color.

At least one is selected from the group consisting of ferric oxide hydroxide particles, hematite particles, magnetite particles and maghemite particles in accordance with a desired color as a material of plastic formed products of the present invention. The content of the ferric oxide hydroxide particles, hematite particles, magnetite particles, maghemite particles or a mixture thereof in the thermoplastic resin or the thermosetting resin is 0.1 to 10.0 wt %.

If the content of the ferric oxide hydroxide particles, hematite particles, magnetite particles and/or maghemite particles is less than 0.1 wt %, the effect of improving the combustion efficiency becomes insufficient. On the other hand, if it exceeds 10.0 wt %, the strength may be greatly lowered and the weather resistance may be deteriorated in the case of a film, for example. In order to enhance the combustion efficiency of the combustible refuse as a whole in an incinerator, the content of the ferric oxide hydroxide particles, hematite particles, magnetite particles and/or maghemite particles is preferably 0.1 to 5.0 wt %, more preferably 0.5 to 3.0 wt %.

When the content of the ferric oxide hydroxide particles, hematite particles, magnetite particles and/or maghemite particles is low, the plastic formed products becomes transparent or translucent. When the content of the ferric oxide hydroxide particles, hematite particles, magnetite particles and/or maghemite particles is large, the product becomes opaque. The content of the ferric oxide hydroxide particles, hematite particles, magnetite particles and/or maghemite particles may be appropriately selected from the above-described range in accordance with the use of the plastic product.

The plastic formed products are products formed according to specific uses and purposes, by an extruding molding, an injection molding, a blow molding, a compression molding, a calendering molding and a casting molding. For example, a film (thickness: less than 0.2 $\mu$m), a sheet (thickness: not less than 0.2 $\mu$m) and a band, which are formed by the extruding molding, and a product formed according to specific uses and purposes may be cited. As the film, a general film such as a film for agriculture, a packaging film for industries, a food-packaging film, etc., a processed product thereof such as a shopping bag, a refuse bags, sorting bag and a packaging bag, a film for packaging heavy-weight articles, and a processed product thereof such as a bag for rice, fertilizer, etc., a cement bag, etc. may be exemplified. Also, a thermoforming film such as a film for packaging foodstuffs, industrial products, etc. may be cited.

As the sheet, a thermoforming sheet, a processed product thereof such as trays and cups formed by a vacuum forming and a pressure forming, etc., may be cited. As the band, a binding band, etc. may be cited. A foaming product and a cushion material produced by a foaming and an extruding molding, containers of all kinds produced by the injection molding, and a bottle produced by a blow molding may be cited.

Among of them, one way-type or disposal-type plastic formed products used in homes and industries easily achieves the objects of the present invention.

A bag as an example of plastic formed products of the present invention is generally produced by supplying a mixture of the above-described thermoplastic resin such as polyethylene-based resins and at least one selected from the group consisting of ferric oxide hydroxide particles, hematite particles, magnetite particles and maghemite particles, melting and kneading the resultant mixture, forming the resultant mixture in the form of a film having about 10 to 100 $\mu$m, preferably 20 to 70 $\mu$m in thickness, by inflation, T-die extrusion or the like, and heat-sealing the film into a predetermined shape.

It is possible to appropriately mix an additive such as known lubricant, antiblocking agent, antioxidizing agent, weathering agent and coloring agent, and add an organic or inorganic filler as occasion demands, to a thermoplastic resin or a thermosetting resin used for plastic formed products of the present invention in addition to the ferric oxide hydroxide particles, hematite particles, magnetite particles, maghemite particles or a mixed particles thereof.

What is the most important in the present invention is the fact that the specific ferric oxide hydroxide particles, hematite particles, magnetite particles, maghemite particles or mixed particles thereof have a nature as a pigment which is capable of providing various colors, and that the thermoplastic resin or the thermosetting resin containing these particles is provided with such an excellent combustion efficiency that it is possible to reduce the amount of residual ash even under the conditions of a low temperature and a low oxygen concentration.

The present inventors consider the reason why this fact rises as follows.

Although the iron atoms on the surfaces of the ferric oxide hydroxide particles, hematite particles, magnetite particles, or maghemite particles are stabilized by the hydroxyl groups on the surfaces which are produced by the dissociation and adsorption of water, dehydration occurs between the hydroxyl groups on the surfaces due to heating in the combustion process, and iron ions and oxygen ions of unsaturated coordination are generated. Such active sites of unsaturated coordination activates oxygen by adsorption thereof in the combustion process and displays the catalytic activity in a series of process such as dehydrogenation of an organic matter, thereby exerting the combustion accelerating effect.

Especially, in the case of using spindle-shaped ferric oxide hydroxide particles, granular hematite particles containing a specific range of water on the surfaces, granular magnetite particles containing a specific range of water on the surfaces, or granular maghemite particles containing a specific range of water on the surfaces are used as the ferric oxide hydroxide particles or iron oxide particles, the number of iron-hydroxyl groups per unit surface area of the particles which can be activated by heating and dehydration is large. In addition, since the spindle-shaped ferric oxide hydroxide particles have a fine structure consisting of a bundle of ultrafine fibers, not only does the water content on the surfaces increase but also dehydration is caused between hydroxyl groups in the crystalline structure in a temperature range of 150 to 350° C. due to the heating operation during combustion, so that the particles become porous and the specific surface area increases, thereby increasing the active sites. As a result, the necessary oxygen contacting efficiency increases and a higher combustion catalytic effect is exerted.

In the spindle-shaped ferric oxide hydroxide particles, dehydration is caused between hydroxyl groups in the crystalline structure in a temperature range of 150 to 350° C., so that it is impossible to measure the water content on the surfaces.

In a bag as an example of plastic formed products of the present invention, the combustion speed in the air is not more than 3.5 minutes/10 mg, preferably not more than 3.0 minutes/10 mg, the complete combustion percentage is not less than 90 wt %, preferably not less than 93 wt %, the low-temperature combustibility is not more than 520° C., preferably not more than 480° C.; the combustion speed under the condition of a low oxygen concentration is not more preferably not more than 3.0 minutes/10 mg, the complete combustion percentage is not less than 88.0 wt %, preferably not less than 90.0 wt %, and the low-temperature combustibility is not more than 535° C., preferably not more than 520° C., as will be shown in the later-described examples.

Figure 1:
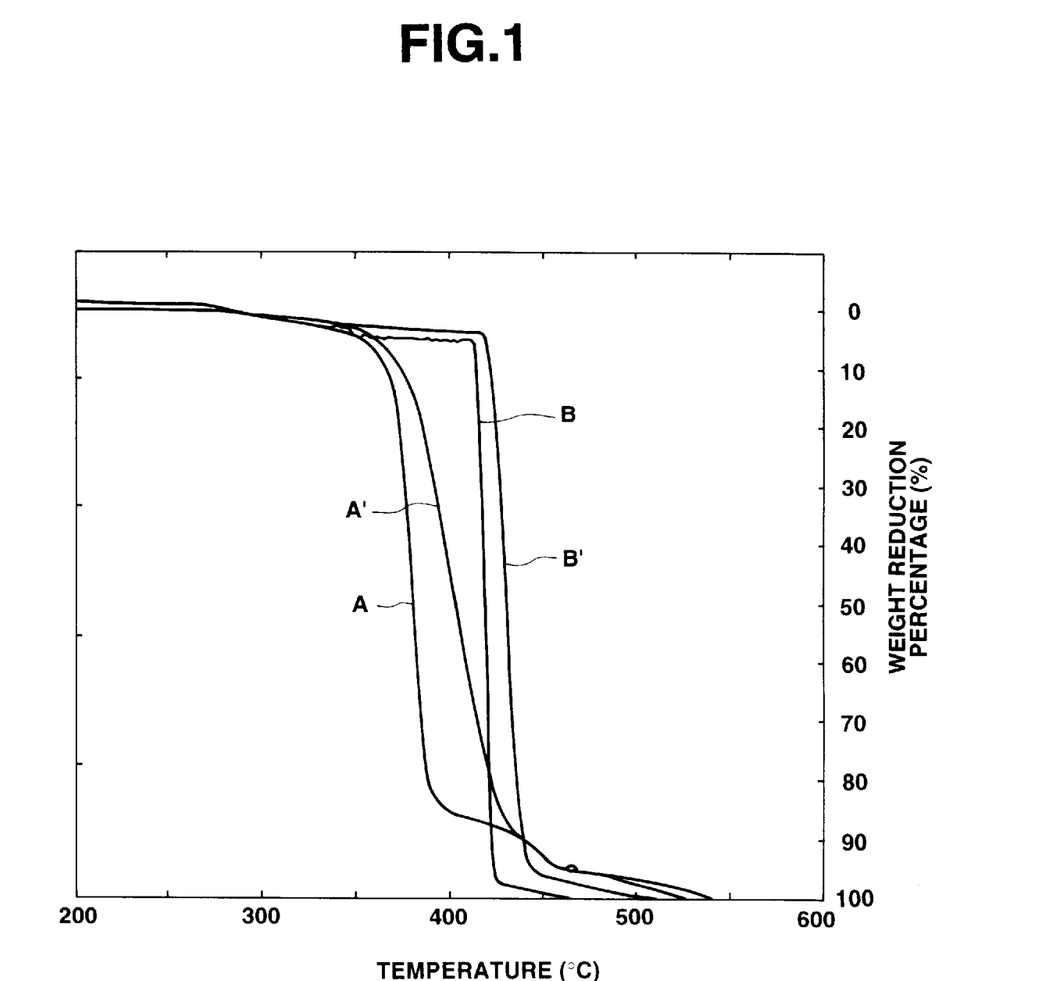
FIG. 1 shows the results of the thermogravimetric analysis of the plastic bags in Comparative Example 1 and Example 7 in the air and under the condition of a low oxygen concentration (air/nitrogen =1/1).

The operation of the spindle-shaped ferric oxide hydroxide particles or granular magnetite particles in a plastic bag of the present invention will now be explained with reference to FIG. 1. The FIG. 1 shows the combustion state of the refuse bags in Comparative Example 1 and Example 7 with respect to the relationship between the temperature and the weight reduction percentage measured by a thermogravimetric analyzer. In the FIG. 1, the ordinate shows the weight reduction percentage (%), the abscissa shows the temperature (°C.), the curve A shows a refuse bag (in the air) in Comparative Example 1, the curve A' shows the refuse bag (under the condition of a low oxygen concentration) in Comparative Example 1, the curve B shows a refuse bag (in the air) in Example 7, and the curve B' shows the refuse bag (under the condition of a low oxygen concentration) in Example 7.

In the FIG. 1, when the curve B and the curve A which show the combustion in the air are compared, since the curve B is steeper than the curve A, it is clear that the combustion speed is higher and the weight is rapidly reduced with combustion so that the combustion is finished in a very shorter time. In the comparison between the combustion in the air and the combustion under the condition of a low oxygen concentration, since the gradient of the curve A' is gentler than the curve A, it is clear that the combustion speed under the condition of a low oxygen concentration is much lower than that in the air. In comparison between the curve B and the curve B', since the gradient is similarly steep in both, it is clear that reduction in the combustion speed under the condition of a low oxygen concentration is small. In addition, although the weight reduction percentage reaches not less than 95 wt % at the point of time when rapid weight reduction is finished in the curves B and B', the weight reduction percentage in the curves A and A' at the point of time when rapid weight reduction is finished is less than 90%. That is, the amount of unburned refuse in Comparative Example 1 is large.

The FIG. 1 shows that in a refuse bag containing spindle-shaped goethite particles, the combustion percentage is high, the combustion speed is not lowered much even under the condition of a low oxygen concentration, and the unburned refuse is small in comparison with a refuse bag which does not contain spindle-shaped goethite particles or granular magnetite particles.

Figure 2:
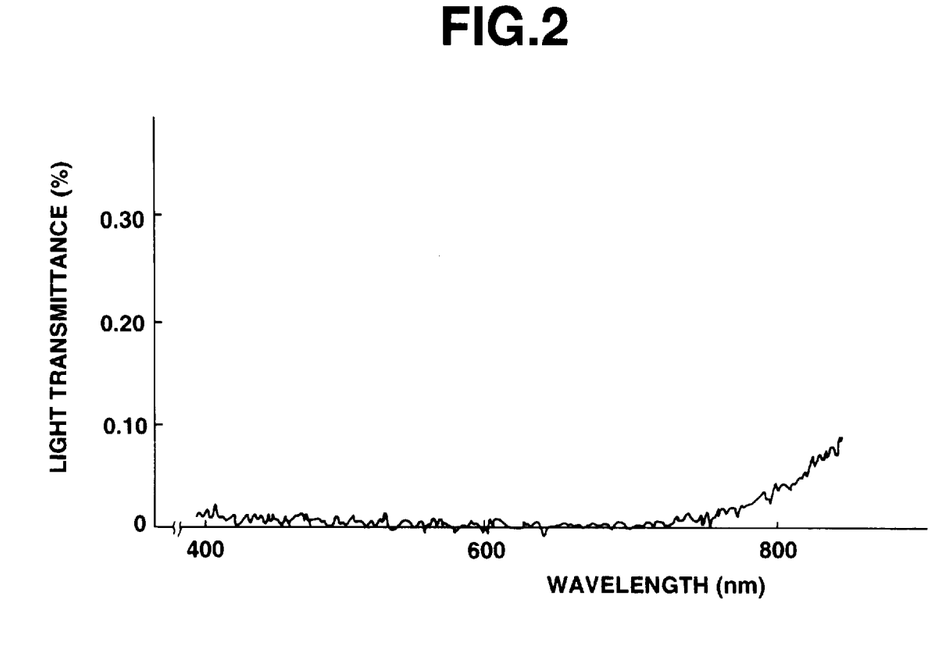
FIG. 2 shows the light transmittance of the mulching-film containing at least one selected from the group consisting of ferric oxide hydroxide particles, hematite particles, magnetite particles and maghemite particles according to the present invention.
Figure 3:
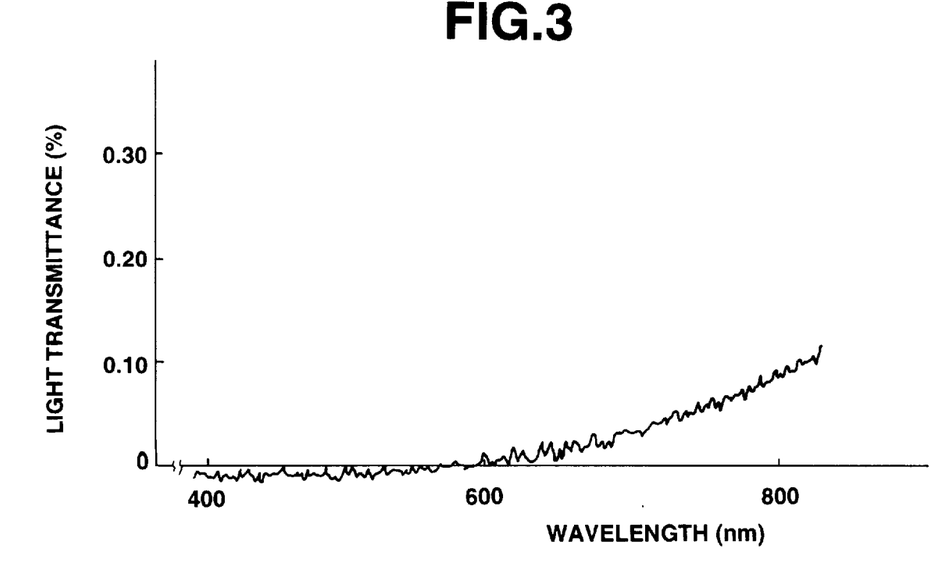
FIG. 3 shows the light transmittance of the mulching-film containing carbon black.

Although it has not been theoretically clarified that use of mulching-film for agriculture according to the present invention enables efficient plant culture, the present inventors consider that not only the film is capable of suppressing the evaporation of the water in the soil and adjusting the oxygen content in the soil but also the magnetite particles contained in the film can completely suppress the transmittance of light having a wavelength of 600 to 700 nm which is suitable for photosynthesis in comparison with the known carbon black, so that it is possible to suppress the growth of weeds, which enables adequate supply and adjustment of fertilizers (refer to FIG. 2 showing a light transmittance of the mulching-film for agriculture containing magnetite particles according to the present invention, and FIG. 3 showing a light transmittance of the film for agriculture containing known carbon black).

The study of operation of ceramics-radiating far infrared rays of accelerating the growth of plants has recently been read in meetings and further study is given to the subject. On the assumption from this point, it is considered that the far infrared radiation of magnetite exerts some influence on the growth of plants.

The present inventors consider that the combustibility is improved in the present invention because the magnetite particles contained in a resin acts as a combustion-assisting catalyst for improving the combustibility of plastics, and as a result, a function of making plastics easy burning is endowed to the resin, judging from the fact that when no magnetite particles are contained in a resin, the combustibility is insufficient.

A mulching-film for agriculture as an example of plastic formed products of the present invention, which is composed of a thermoplastic resin, and 0.1 to 10 wt % of at least one selected from the group consisting of ferric oxide hydroxide particles, hematite particles, magnetite particles and maghemite particles, wherein the average major axial diameter or the plate diameter of the ferric oxide hydroxide particles is 0.02 or 2.0 $\mu$m and the average aspect ratio or the plate ratio of the ferric oxide hydroxide particles is 2 to 20; and the average particle size of the hematite particles, magnetite particles and maghemite particles is 0.01 to 1.0 $\mu$m, the BET specific surface area of the hematite particles, magnetite particles and maghemite particles is 1 to 120 m$^2$/g, and the water content on the surfaces of the hematite particles, magnetite particles and maghemite particles is not less than 0.02 wt %/m$^2$/g, is capable of effectively increasing the degree of sweetness in fruits and the like, effectively cultivating plants by accelerating the growth, or effectively increasing the weight of vegetables, fruits and flowers. The ignition temperature of the plastic can lower as will be explained in detail in the later-described examples. In addition, by increasing the combustion speed, the combustibility is improved, so that no or little unburned portion is generated.

As a result of measurement of the light transmittance of a polyethylene resin containing magnetite particles of the present invention (FIG. 2) and a polyethylene resin containing the known carbon black (FIG. 3), it was recognized that the polyethylene resin of the present invention completely suppresses the transmittance of light having a wavelength of 600 to 700 nm which is suitable for photosynthesis, while the known polyethylene resin cannot completely suppress the transmittance of light having a wavelength of 600 to 700 nm.

Since an easy burning mulching-film for agriculture of the present invention is excellent in combustibility and little unburned portion remains, as described above, the advantageous effect of combustion energy at the time of incineration can be expected in the respect of environmental protection.

A plastic bag of the present invention is advantageous in that it is possible to control the color tone and the transparency by appropriately selecting the kind of particles and content of the ferric oxide hydroxide particles, hematite particles, magnetite particles and/or maghemite particles and in that when the content of these particles is reduced, since it is possible to provide a bag having an excellent external appearance by using another coloring agent so as to color the bag with a desired color. In addition, the necessary content of the particles is not so large, there is no fear of lowering the mechanical strength or staining clothes, and there is no problem in the safety.

When a plastic bag of the present invention is reused as a refuse bag in homes after it is used for the original use, since the ferric oxide hydroxide particles, hematite particles, magnetite particles and/or maghemite particles which operate as a combustion accelerator are contained, it exhibits the combustion accelerating operation when it is incinerated together with combustible refuse, and even if the incinerator is operated under the conditions of a low temperature and a low oxygen concentration, which are considered to be effective for suppressing the NOx content and preventing the breakage of the incinerator, it is possible to incinerate combustible refuse with efficiency and reduce the generation of unburned refuse and residual ash. If the content of the ferric oxide hydroxide particles, hematite particles, magnetite particles and/or maghemite particles is increased, it is naturally possible to reduce the calorific value in the same way as in the case of a plastic refuse bag containing calcium carbonate.

The effect of suppressing the generation of dioxins by the catalyst combusting operation which the ferric oxide hydroxide particles and/or iron oxide particles originally have can also be expected, and the effect of reducing a conventional insolubilizing treatment by lowering the solubility of heavy metals in the residual ash into water can be expected due to a ferrite formed by the reaction of the ferric oxide hydroxide particles, hematite particles, magnetite particles or maghemite particles with an oxide of a heavy metal during incineration.

EXAMPLES

The present invention will now be explained with reference to examples and comparative examples.

The combustion efficiency was evaluated by the combustion speed, complete combustion percentage and low-temperature combustibility.

In order to determine the combustion speed, 10 mg of a plastic bag was weighted and a change in the weight at the time of raising the temperature at a rate of 10° C./min in the air of 300 ml/min or under the condition of a low oxygen concentration (air/nitrogen=1:1) was measured by a thermogravimetric analyzer (manufactured by Seiko Instruments and Electronics, Ltd.). The combustion speed is expressed by the time taken from the start of a rapid weight reduction until the end of the rapid weight reduction (it is presumed that combustion is produced during this period).

The preferable combustion speed in the present invention is not more than 3.5 minutes/10 mg, more preferably not more than 3.0 minutes/10 mg in the air, and not more than 4.0 minutes/10 mg, more preferably not more than 3.5 minutes/10 mg under the condition of a low oxygen concentration.

The complete combustion percentage (it is considered that the larger the value, the less the unburned refuse or residual ash) was expressed by the weight reduction percentage (%) of the combustible refuse at the time of the end of the rapid weight reduction in the measurement of the combustion ratio.

The preferable complete combustion percentage according to the present invention is not less than 90.0 wt %, more preferably not less than 93.0 wt % in the air, and not less than 88.0 wt %, more preferably not less than 90.0 wt % under the condition of a low oxygen concentration.

The low-temperature combustibility (it is considered to be a temperature necessary for completely burning an organic matter) was expressed by the temperature at which the weight reduction is stopped in the measurement of the combustion ratio.

The preferable low-temperature combustibility according to the present invention is not more than 520° C., more preferably not more than 490° C. in the air, and not more than 535° C., more preferably not more than 520° C. under the condition of a low oxygen concentration.

The water content (SW) on the surfaces of the granular magnetite particles, hematite particles and maghemite particles was expressed by the value obtained by dividing the Karl Fischer water content (wt %) measured by a trace water content measuring apparatus Model AQ-6 (manufactured by Hiranuma Sangyo Co., Ltd.) under the following conditions by the BET specific surface area ($m^2/g$).

Water content vaporization conditions

Temperature: 120 to 250° C.

Carrier gas: nitrogen (300 ml/min)

Amount of sample: 0.5 g

Calclucation formula $$SW = \frac{W_{250} - W_{120}}{BET \text{ specific surface area}} (wt \ \%/m^2/g)$$

wherein $W_{250}$ represents the water content (wt %) when water content is evaporated at 250° C., and $W_{120}$ the water content (wt %) when water content is evaporated at 120° C.

Examples 1 to 8, Comparative Examples 1 to 5

A shopping bag was produced by kneading a predetermined amount of spindle-shaped goethite particles as ferric oxide hydroxide particles, and a predetermined amount of granular magnetite particles, spindle-shaped hematite particles and spindle-shaped maghemite particles as iron oxide particles with a high-density polyethylene, producing a tubular film having a thickness of 30 μm by inflation extrusion, and heat-sealing the bottom portion of the film. The properties of each bag is shown in Table 1.

A shopping bag (Comparative Example 1) composed of only a high-density polyethylene containing no ferric oxide hydroxide particles or iron oxide particles, a shopping bag (Comparative Example 2) composed of a high-density polyethylene containing titanium oxide, a shopping bag (Comparative Example 3) composed of a high-density polyethylene containing 0.08 wt % of granular magnetite particles, a shopping bag (Comparative Example 4) composed of a high-density polyethylene containing 0.08 wt % of spindle-shaped goethite particles, and a shopping bag (Comparative Example 5) composed of a high-density polyethylene containing 0.08 wt % of spindle-shaped hematite particles were produced for the sake of comparison. The properties of each bag are also shown in Table 1.

TABLE 1

| | Shopping bag Contents | | |
|---|---|---|---|
| | Kind | BET (m²/g) | Average particle diameter (μm) |
| Ex. 1 | Granular magnetite | 5.4 | 0.28 |
| Ex. 2 | Granular magnetite | 21 | 0.06 |
| Ex. 3 | Spindle-shaped goethite | 80 | 0.30 |
| Ex. 4 | Spindle-shaped goethite | 80 | 0.30 |
| Ex. 5 | Spindle-shaped goethite | 80 | 0.30 |
| Ex. 6 | Spindle-shaped goethite | 145 | 0.21 |
| Ex. 7 | Spindle-shaped goethite | 45 | 0.23 |
| Ex. 8 | Spindle-shaped goethite | 40 | 0.21 |
| Comp. Ex. 1 | None | — | — |
| Comp. Ex. 2 | Titanium oxide | — | — |
| Comp. Ex. 3 | Granular magnetite | 5.4 | 0.28 |
| Comp. Ex. 4 | Spindle-shaped goethite | 80 | 0.30 |
| Comp. Ex. 5 | Spindle-shaped hematite | 45 | 0.23 |

| | Shopping bag Contents | | |
|---|---|---|---|
| | Aspect ratio (major axial diameter/minor axial diameter) | SW (wt %/m²/g) | Content (wt %) |
| Ex. 1 | — | 0.035 | 3.00 |
| Ex. 2 | — | 0.023 | 3.00 |
| Ex. 3 | 12 | — | 0.14 |
| Ex. 4 | 12 | — | 0.56 |
| Ex. 5 | 12 | — | 1.40 |
| Ex. 6 | 4 | — | 2.80 |
| Ex. 7 | 8 | — | 3.00 |
| Ex. 8 | 6 | — | 3.00 |
| Comp. Ex. 1 | — | — | — |
| Comp. Ex. 2 | — | — | 3.00 |
| Comp. Ex. 3 | — | 0.035 | 0.08 |
| Comp. Ex. 4 | 12 | — | 0.08 |
| Comp. Ex. 5 | 8 | — | 0.08 |

| | Combustion speed (minute) | | Complete combustion ratio (wt %) | |
|---|---|---|---|---|
| | in the air | low oxygen concentration | in the air | low oxygen concentration |
| Ex. 1 | 1.60 | 3.21 | 97.6 | 93.8 |
| Ex. 2 | 1.65 | 3.18 | 94.6 | 91.0 |
| Ex. 3 | 1.83 | 3.96 | 97.0 | 93.5 |
| Ex. 4 | 1.79 | 3.32 | 97.0 | 95.0 |
| Ex. 5 | 1.17 | 2.34 | 98.6 | 97.4 |
| Ex. 6 | 1.10 | 2.22 | 96.8 | 94.5 |
| Ex. 7 | 2.34 | 3.90 | 95.9 | 95.9 |
| Ex. 8 | 1.95 | 3.67 | 96.9 | 95.9 |
| Comp. Ex. 1 | 3.90 | 6.23 | 83.0 | 89.0 |
| Comp. Ex. 2 | 7.98 | — | 89.0 | — |
| Comp. Ex. 3 | 4.04 | 5.85 | 84.5 | 87.2 |
| Comp. Ex. 4 | 3.39 | 5.54 | 84.2 | 88.6 |
| Comp. Ex. 5 | 4.06 | — | 85.6 | — |

TABLE 1-continued

| | Low-temperature combustibility (°C.) | | |
|---|---|---|---|
| | in the air | low oxygen concentration | Color tone |
| Ex. 1 | 490 | 500 | Translucent black |
| Ex. 2 | 485 | 495 | Translucent black |
| Ex. 3 | 490 | 530 | Transparent light yellow |
| Ex. 4 | 485 | 520 | Transparent light yellow |
| Ex. 5 | 480 | 495 | Translucent light yellow |
| Ex. 6 | 450 | 465 | Translucent yellow |
| Ex. 7 | 500 | 515 | Translucent red |
| Ex. 8 | 495 | 515 | Translucent brown |
| Comp. Ex. 1 | 535 | 540 | Colorless, transparent |
| Comp. Ex. 2 | 540 | — | Translucent milk white |
| Comp. Ex. 3 | 535 | 540 | Transparent light black |
| Comp. Ex. 4 | 505 | 530 | Transparent light yellow |
| Comp. Ex. 5 | 535 | — | Transparent light red |

Note: 1) The average particle diameter of spindle-shaped particles is represented by the major axial diameter.

It is clear from Table 1 that when the shopping bag in any of Examples 1 to 8 is incinerated, the amount of residual ash is small in spite of a very high combustion speed as compared with the shopping bag composed of only a high-density polyethylene in Comparative Example 1 and the commercially available shopping bag containing titanium oxide in Comparative Example 2. In addition, the shopping bags in Examples 3 to 6 containing spindle-shaped goethite particles have a beautiful external appearance of a translucent yellow color because a small amount of goethite particles suffices, and there was no problem in the mechanical strength. On the other hand, the combustion time of the commercially available shopping bag in Comparative Example 2 was very long, and a large amount of unburned portion remained at the end of incineration. The shopping bags in Comparative Examples 3 to 5 which contained less than 0.1 wt % of ferric oxide hydroxide particles or iron oxide particles did not exhibit the effect of enhancing the combustion efficiency.

Examples 9 to 18, Comparative Examples 6 to 12

A plastic refuse bag was produced by mixing a predetermined amount of spindle-shaped goethite particles or granular magnetite particles having not less than 0.02 wt %/m²/g of a water content on the surfaces with a low-density polyethylene, producing a tubular film having a thickness of 30 μm by inflation extrusion, and heat-sealing the bottom portion of the film. The properties of each bag are shown in Table 2.

A refuse bag (Comparative Example 6) composed of only a low-density polyethylene containing no spindle-shaped goethite particles or granular magnetite particles, refuse bags (Comparative Examples 7 and 8) composed of a low-density polyethylene and a predetermined amount of carbon black or calcium carbonate, a refuse bag (Comparative Example 9) composed of a low-density polyethylene and 3.0 wt % of granular magnetite particles having less than 0.02 wt %/m²/g of a water content on the surfaces, a refuse bag (Comparative Example 10) composed of a low-density polyethylene and 0.08 wt % of granular magnetite particles having not less than 0.02 wt %/m²/g of a water on the surfaces, and refuse bags (Comparative Examples 11 and 12) composed of a low-density polyethylene and less than 0.1 wt % of spindle-shaped goethite particles, were produced under the same conditions as in Examples 9 to 18 for the sake of comparison. The properties of each bag are also shown in Table 2.

TABLE 2

| | Plastic refuse bag Contents | | |
|---|---|---|---|
| | Kind | BET ($m^2/g$) | Average particle diameter ($\mu m$) |
| Ex. 9 | Granular magnetite | 5.4 | 0.28 |
| Ex. 10 | Granular magnetite | 5.4 | 0.28 |
| Ex. 11 | Granular magnetite | 5.4 | 0.28 |
| Ex. 12 | Granular magnetite | 21 | 0.06 |
| Ex. 13 | Spindle-shaped goethite | 80 | 0.30 |
| Ex. 14 | Spindle-shaped goethite | 80 | 0.30 |
| Ex. 15 | Spindle-shaped goethite | 80 | 0.30 |
| Ex. 16 | Spindle-shaped goethite | 80 | 0.30 |
| Ex. 17 | Spindle-shaped goethite | 145 | 0.21 |
| Ex. 18 | Spindle-shaped goethite | 53 | 0.42 |
| Comp. Ex. 6 | None | — | — |
| Comp. Ex. 7 | Carbon black | — | — |
| Comp. Ex. 8 | Calcium carbonate | — | — |
| Comp. Ex. 9 | Granular magnetite | 7.5 | 0.22 |
| Comp. Ex. 10 | Granular magnetite | 7.5 | 0.22 |
| Comp. Ex. 11 | Spindle-shaped goethite | 80 | 0.30 |
| Comp. Ex. 12 | Spindle-shaped goethite | 80 | 0.30 |

| | Plastic refuse bag Contents | | |
|---|---|---|---|
| | Aspect ratio (major axial diameter/minor axial diameter) | SW (wt %/$m^2$/g) | Content (wt %) |
| Ex. 9 | — | 0.035 | 0.60 |
| Ex. 10 | — | 0.035 | 3.00 |
| Ex. 11 | — | 0.035 | 6.00 |
| Ex. 12 | — | 0.023 | 3.00 |
| Ex. 13 | 12 | — | 0.14 |
| Ex. 14 | 12 | — | 0.28 |
| Ex. 15 | 12 | — | 1.40 |
| Ex. 16 | 12 | — | 2.80 |
| Ex. 17 | 4 | — | 2.80 |
| Ex. 18 | 5 | — | 2.80 |
| Comp. Ex. 6 | — | — | — |
| Comp. Ex. 7 | — | — | 4.00 |
| Comp. Ex. 8 | — | — | 8.00 |
| Comp. Ex. 9 | — | 0.012 | 3.00 |
| Comp. Ex. 10 | — | 0.035 | 0.08 |
| Comp. Ex. 11 | 12 | — | 0.03 |
| Comp. Ex. 12 | 12 | — | 0.08 |

TABLE 2-continued

| | Combustion speed (minute) | | Complete combustion ratio (wt %) | |
|---|---|---|---|---|
| | in the air | low oxygen concentration | in the air | low oxygen concentration |
| Ex. 9 | 3.42 | 3.75 | 92.0 | 89.5 |
| Ex. 10 | 2.20 | 2.90 | 93.8 | 88.6 |
| Ex. 11 | 2.66 | 2.80 | 95.7 | 88.2 |
| Ex. 12 | 2.05 | 2.90 | 96.2 | 90.3 |
| Ex. 13 | 1.90 | 3.00 | 96.0 | 95.0 |
| Ex. 14 | 1.44 | 2.66 | 96.5 | 95.0 |
| Ex. 15 | 1.44 | 2.78 | 97.0 | 94.9 |
| Ex. 16 | 1.33 | 2.20 | 96.9 | 93.0 |
| Ex. 17 | 1.25 | 2.15 | 97.3 | 94.2 |
| Ex. 18 | 1.63 | 2.70 | 96.5 | 93.0 |
| Comp. Ex. 6 | 4.25 | 7.22 | 82.0 | 88.0 |
| Comp. Ex. 7 | 6.63 | — | 92.0 | — |
| Comp. Ex. 8 | 7.60 | — | 88.0 | — |
| Comp. Ex. 9 | 3.67 | 4.68 | 89.8 | 88.3 |
| Comp. Ex. 10 | 4.33 | 5.05 | 83.9 | 85.0 |
| Comp. Ex. 11 | 3.80 | — | 81.2 | — |
| Comp. Ex. 12 | 3.04 | — | 83.6 | — |

| | Low-temperature combustibility (°C.) | |
|---|---|---|
| | in the air | low oxygen concentration |
| Ex. 9 | 520 | 535 |
| Ex. 10 | 470 | 485 |
| Ex. 11 | 415 | 430 |
| Ex. 12 | 465 | 480 |
| Ex. 13 | 485 | 520 |
| Ex. 14 | 460 | 500 |
| Ex. 15 | 460 | 490 |
| Ex. 16 | 420 | 430 |
| Ex. 17 | 415 | 430 |
| Ex. 18 | 465 | 490 |
| Comp. Ex. 6 | 530 | 540 |
| Comp. Ex. 7 | >580 | — |
| Comp. Ex. 8 | 450 | — |
| Comp. Ex. 9 | 510 | 525 |
| Comp. Ex. 10 | 530 | 535 |
| Comp. Ex. 11 | 510 | — |
| Comp. Ex. 12 | 500 | — |

Note: 1) The average particle diameter of spindle-shaped particles is represented by the major axial diameter.

It is clear from Table 2 that the plastic refuse bags in Examples 9 to 18 are superior in any of the combustion speed, complete combustion percentage and low-temperature combustibility than the plastic refuse bag composed of only a low-density polyethylene in Comparative Example 6.

In Comparative Examples 6 to 12, although the refuse bag containing carbon black in Comparative Example 7 has a higher complete combustion percentage, the combustion speed and the low-temperature combustibility are lower than those of the refuse bag in Comparative Example 6. Although the refuse bag containing calcium carbonate in Comparative Example 8 has an improved low-temperature combustibility, the combustion speed is lowered and the complete combustion percentage is not greatly improved as compared, the combustion speed and the low-temperature combustibility are lower than those of the refuse bag in Comparative Example 6.

In the plastic refuse bag in Comparative Example 10 which was produced from a low-density polyethylene mixed with granular magnetite particles having not less than 0.02 wt %/m²/g of water content on the surfaces, although the combustion speed was enhanced, the complete combustion percentage and the low-temperature combustibility were not greatly improved.

It has also been found that if the content of the spindle-shaped goethite particles or granular magnetite particles is less than 0.1 wt % as in the plastic refuse bags in Comparative Examples 10 to 12, the addition of the particles does not exert much good influence on the combustion speed, the complete combustion percentage or the low-temperature combustibility.

Examples 19 to 21 and Comparative Examples 13 to 14

AS a thermosetting resin, a novolac-type phenol resin and an epoxy resin were used.

The plastic sheet was produced by mixing the predetermined amount of spindle-shaped goethite particles (a BET specific surface area: 80 m²/g, an average major axial diameter: 0.3 μm) with each of the novolac-type phenol resin and epoxy resin, further mixing each of the obtained mixtures with a curing agent (novolac-type phenol resin: hexamethylenetetramine, epoxy resin: a polyamide resin), and molding and heat-curing the resultant mixture to form a sheet having 1 mm in thickness.

A sheet (Comparative Example 13) composed of only novolac-type phenol resin containing no spindle-shaped goethite particles, and a sheet (Comparative Example 14) composed of only epoxy resin containing no spindle-shaped goethite particles were produced under the same conditions as in Example 19 for the sake of comparison.

The properties of each sheet are shown in Table 3.

It is clear from Table 3 that the sheets made of the thermosetting resins in Examples 19 to 21 are superior in the complete combustion percentage and low-temperature combustibility to those of Comparative Examples 13 to 14.

TABLE 3

| | | Sheet | | | |
|---|---|---|---|---|---|
| | | Particles | | | |
| | Thermosetting resin | Kind | BET (m²/g) | Average particle diameter (μm) | Content (wt %) |
| Ex. 19 | Phenol resin | Spindle-shaped goethite | 80 | 0.3 | 1 |
| Ex. 20 | Phenol resin | Spindle-shaped goethite | 80 | 0.3 | 4 |
| Ex. 21 | Epoxy resin | Spindle-shaped goethite | 80 | 0.3 | 4 |
| Comp. Ex. 13 | Phenol resin | None | — | — | 0 |
| Comp. Ex. 14 | Epoxy resin | None | — | — | 0 |

TABLE 3-continued

| | Complete combusion ratio (wt %) | | Low-temperature combustibility (°C.) | |
|---|---|---|---|---|
| | in the air | low oxygen concentration | in the air | low oxygen concentration |
| Ex. 19 | 99.6 | — | 602 | — |
| Ex. 20 | 99.8 | 99.6 | 586 | 622 |
| Ex. 21 | 99.5 | 98.8 | 499 | 505 |
| Comp. Ex. 13 | 96.8 | 94.3 | 631 | 714 |
| Comp. Ex. 14 | 81.2 | 83.2 | 600 | 639 |

Note: 1) The average particle diameter of spindle-shaped particles is represented by the major axial diameter.

Example 22

50 g of octahedral magnetite particles having an average particle diameter of 0.3 μm were mixed in 950 g of a polyethylene resin by an ordinary method, and the resultant mixture was kneaded and pulverized to obtain a composite material composed of polyethylene resin and magnetite particles (the magnetite particles was equivalent to 5 wt % of the total sum of the polyethylene resin and the magnetite particles).

Figure 4:
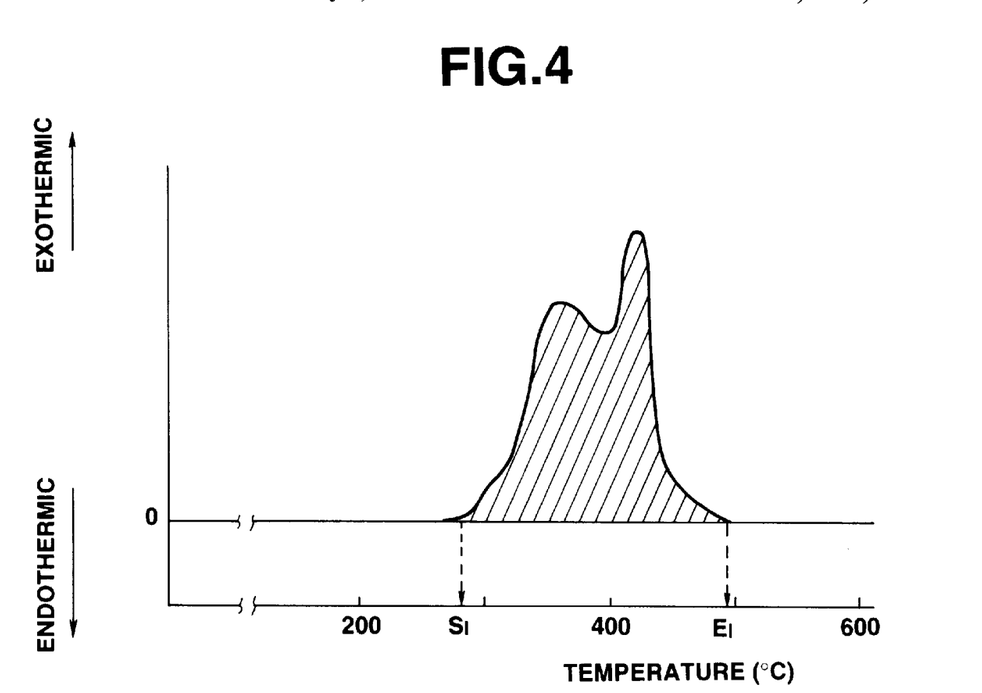
FIG. 4 shows the result of the differential thermal analysis of the mulching-film obtained in Example 22.
Figure 5:
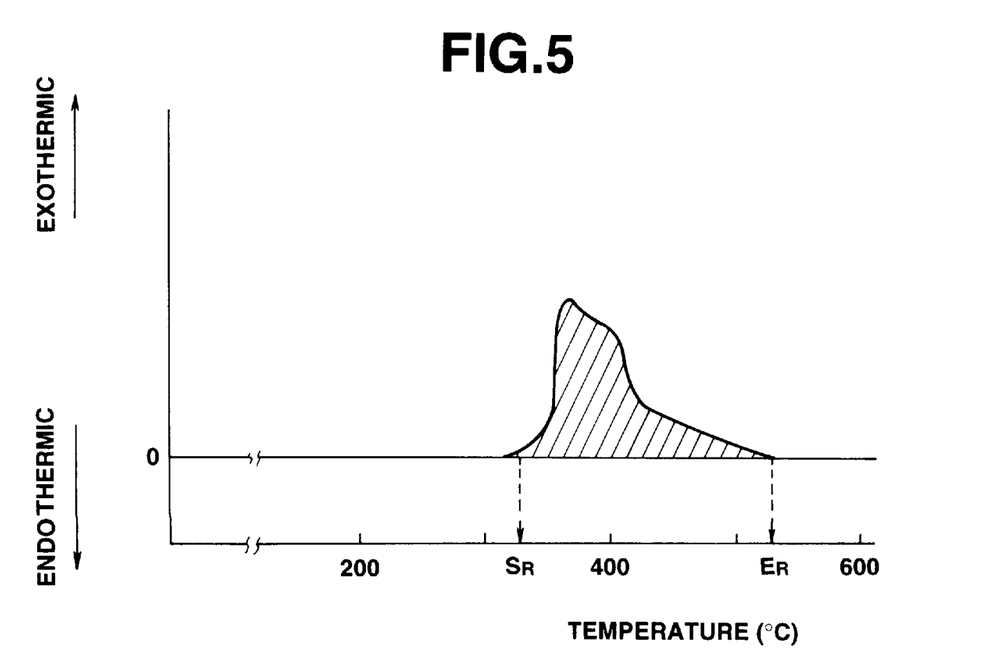
FIG. 5 shows the result of the differential thermal analysis of the mulching-film obtained in Comparative Example 13.

As a result of the differential thermal analysis of the polyethylene resin (refer to FIG. 4), it was found that the ignition starting temperature $S_I$ was 280° C., and the ignition end temperature $E_I$ was 490° C. As compared with FIG. 5 which is a result of the differential thermal analysis the polyethylene resin of Comparative Example 15 described later, since the area ratio indicated by a hatched portion is respectively large, it was proved that the calorific value was large.

The fact that the ignition starting temperature was 50° C. lower than that in Comparative Example 15, which will be described later, means that the ignitability was excellent. The fact that the ignition starting temperature was 40° C. lower than that in Comparative Example 15, means that the combustion speed was high, and the fact that the calorific value was high, means that there was a small unburned portion.

The molten kneaded mixture obtained in the above-described manner was formed and processed into a polyethylene resin film (mulching-film for agriculture) of 20 μm thick containing 5 wt % of magnetite particles. When one end of the polyethylene resin film was ignited, the film was easily burned and no unburned portion remained.

Example 23

The same molten kneaded mixture of the polyethylene resin as in Example 22 was formed and processed into a polyethylene resin film having 30 μm in thickness and containing 5 wt % of magnetite particles.

The influence of the polyethylene resin film on the degree of sweetness of vegetables and fruits was investigated. One Satsuma mandarin orange tree was divided into two portions in the direction of east and west so that the conditions are equal in the direction of north and south. The mandarin oranges in the east portion were covered with the sacks of the polyethylene film 14 days before the harvest, while the west portion remained as it was.

The mandarin oranges covered with sacks and the mandarin oranges without sacks were harvested separately from each other. As a result of measurement of the degree of sweetness by a light refractometer, the average degree of sweetness of 20 mandarin oranges was 18, which was higher than the average degree of sweetness of 14 of 20 mandarin oranges covered with no sack.

The used polyethylene resin films were collected and one end thereof was ignited. The polyethylene films were easily burned and no unburned portion remained.

Example 24

A polyethylene resin containing 1 wt % of magnetite particles similar to those in Example 22 was used and the influence of the polyethylene resin on the acceleration of the growth and the increase in the weight of vegetables was investigated, The polyethylene resin was applied to the surface of a foamed polystyrene board to a thickness of 100 μm, and the thus-obtained board was used as a pedestal for slop culture of Welsh onions. When the Welsh onions were harvested 55 days after fix planting, the total weight of the Welsh onions was 127 g, the total length was 814 cm, and acceleration of the growth and the increase in the weight were recognized.

For comparison, Welsh onions were cultured in the same way except for applying a polyethylene resin containing no magnetite particles to the surface of a foamed polystyrene. The total weight of the harvested Welsh onions was 117 g, and the total length was 747 cm.

The used foamed polystyrene with the polyethylene resin containing magnetite particles applied thereto was collected and ignited. The foamed polystyrene was easily burned and no unburned portion remained.

For comparison, when the used foamed polystyrene with only the polyethylene resin applied thereto was collected and ignited, the polystyrene board was molten and shrunk, so that continuous combustion was impossible and an unburned portion remained.

Comparative Example 15

As a result of the differential thermal analysis of a polyethylene resin produced in the same way as in Example 22 except that no magnetite particles were mixed (refer to FIG. 5), it was found that the ignition starting temperature $S_R$ was as high as 330° C., which means that, the ignitability was bad, and that the ignition end temperature $E_R$ was as high as 530° C., which means that the combustion speed was low. Since the area ratio in the chart of the differential thermal analysis was small, it was proved that the calorific value was small, so that continuous combustion was impossible and an unburned portion remained.

What is claimed is:

1. A plastic article comprising:
   a thermoplastic resin or a thermosetting resin; and
   0.1 to 10 wt %, based on the weight of the plastic article, of ferric oxide hydroxide particles;
   wherein said ferric oxide hydroxide particles are spindle-shaped, acicular-shaped or plate-shaped particles having an average major axial diameter or plate diameter of 0.02 to 2.0 μm, an average aspect ratio or plate ratio of 2 to 20, a sulfur content of not more than 0.8 wt %, a sodium content of not more than 0.5 wt % and a particle size distribution of not more than 60%.

2. A plastic article according to claim 1, wherein said ferric oxide hydroxide particles are spindle-shaped particles having a major axial diameter of 0.05 to 1.5 μm, an aspect ratio of 2 to 18, a BET specific surface area of 30 to 250 $m^2/g$, a sulfur content of not more than 0.2 wt %, a sodium content of not more than 0.5 wt % and a particle size distribution of not more than 50%.

3. A plastic article according to claim 2, wherein said ferric oxide hydroxide particles are spindle-shaped goethite particles.

4. A plastic article according to claim 2, wherein said ferric oxide hydroxide particles are spindle-shaped particles having a major axial diameter of 0.1 to 0.5 μm, an aspect ratio of 3 to 15, a BET specific surface area of 50 to 150 $m^2/g$, a sulfur content of not more than 0.08 wt %, a sodium content of not more than 0.3 wt % and a particle size distribution of not more than 40%.

5. A plastic article according to claim 1, wherein said ferric oxide hydroxide particles are acicular-shaped particles having an average major axial diameter of 0.05 to 2.0 μm, an average aspect ratio of 2 to 20, a BET specific surface area of 10 to 200 $m^2/g$, a sulfur content of not more than 0.1 wt %, a sodium content of not more than 0.5 wt % and a particle size distribution of not more than 60%.

6. A plastic article according to claim 5, wherein said ferric oxide hydroxide particles are acicular-shaped particles having an average major axial diameter of 0.1 to 0.8 μm, an average aspect ratio of 5 to 15, a BET specific surface area of 15 to 100 $m^2/g$, a sulfur content of not more than 0.05 wt %, a sodium content of not more than 0.3 wt % and a particle size distribution of not more than 50%.

7. A plastic article according to claim 1, wherein said ferric oxide hydroxide particles are plate-shaped particles having an average plate diameter of 0.02 to 1.5 μm, an average plate ratio of 3 to 15, a BET specific surface area of 1 to 150 $m^2/g$, a sulfur content of not more than 0.1 wt %, the sodium content of not more than 0.1 wt % and the particle size distribution of not more than 50%.

8. A plastic article according to claim 7, wherein said ferric oxide hydroxide particles are plate-shaped particles having an average plate diameter of 0.03 to 0.5 μm, an average plate ratio of 5 to 10, a BET specific surface area of 20 to 100 $m^2/g$, a sulfur content of not more than 0.05 wt %, a sodium content of not more than 0.05 wt % and a particle size distribution of not more than 40%.

9. A plastic article according to claim 1, in a film, sheet or band formed by extruding molding a tray produced by vacuum forming or pressure forming, a cup produced by vacuum forming or pressure forming, a foamed product produced by foaming molding, a cushion material produced by extruding molding, a container producing by injection molding, a bottle produced by blow molding, or a bag produced by inflation or T-die molding and heat-sealing.

10. A plastic article comprising:
    a thermoplastic resin or a thermosetting resin; and
    0.1 to 10 wt % based upon the weight of the plastic article, of hematite particles, magnetite particles, maghemite particles or mixtures thereof;
    wherein said hematite particles, magnetite particles and maghemite particles are:
    (i) granular-shaped particles having an average particle size of 0.01 to 1.0 μm, a BET specific surface area of 1 to 120 $m^2/g$, a sulfur content of not more than 0.8 wt %, a sodium content of not more than 0.5 wt %, a particle size distribution of not more than 50%, and a surface water content of 0.02 to 0.10 wt %/$m^2/g$,
    (ii) spindle-shaped or acicular-shaped particles having an average major axial diameter of 0.03 to 1.0 μm, an average aspect ratio of 2 to 12, a BET specific surface area of 5 to 200 $m^2/g$, a sulfur content of not more than 0.2 wt %, a sodium content of not more than 0.5 wt %, a particle size distribution of not more than 50%, and a surface water content of 0.02 to 0.10 wt %/m$^2$/g, or (iii) plate-shaped particles having an average plate diameter of 0.05 to 5.0 μm, a plate ratio of 4 to 50, a BET specific surface area of 2 to 100 m$^2$/g, and a surface water content of 0.02 to 0.10 wt %/m$^2$/g.

11. A plastic article according to claim 10, wherein said hematite particles, magnetite particles or maghemite particles are granular-shaped particles having an average particle size of 0.05 to 0.5 μm, a BET specific surface area of 2 to 30 m$^2$/g, a sulfur content of to more than 0.6 wt %, a sodium content of not more than 0.25 wt %, a particle size distribution of not more than 40%, and a surface water content of 0.02 to 0.10 wt %/m$^2$/g.

12. A plastic article according to claim 10, wherein said hematite particles, magnetite particles or maghemite particles are spindle-shaped or acicular-shaped particles having an average major axial diameter of 0.05 to 0.3 μm, an average aspect ratio of 3 to 10, a BET specific surface area of 20 to 100 m$^2$/g, a sulfur content of not more than 0.1 wt %, a sodium content of not more than 0.35 wt %, a particle size distribution of not more than 45%, and a surface water content of 0.02 to 0.10 wt %/m$^2$/g.

13. A plastic article according to claim 10, wherein said hematite particles, magnetite particles or maghemite particles are plate-shaped particles having an average plate diameter of 0.2 to 3.0 μm, a plate ratio of 5 to 30, a BET specific surface area of 3 to 50 m$^2$/g, and a surface water content of 0.02 to 0.10 wt %/m$^2$/g.

14. A plastic article according to claim 10, in a film, sheet or band formed by extruding molding, a tray produced by vacuum forming or pressure forming, a cup produced by vacuum forming or pressure forming, a foamed product produced by foaming molding, a cushion material produced by extruding molding, a container producing by injection molding, a bottle produced by blow molding, or a bag produced by inflation or T-die molding and heat-sealing.

* * * * *